Patented Sept. 25, 1945 2,385,719

UNITED STATES PATENT OFFICE 2,385,719

AMINE SALTS OF NITRATED PHENOLIC COMPOUNDS AND A METHOD OF PREPARING THE SAME

Vartkes Migrdichian, Greenwich, Conn., assignor to American Cyanamid Company, New York, N. Y., a corporation of Maine No Drawing. Application September 9, 1942, Serial No. 457,744

7 Claims. (Cl. 260—564)

The present invention relates to amine salts of nitrated phenolic compounds and to a method of preparing the same.

It is known that the alkali metal salts of various nitrated phenolic compounds are effective insecticides. However, many of these compounds, for example, the sodium and potassium salts of dinitro-ortho-cresol, possess the serious disadvantage in that they burn with explosive violence.

I have discovered a group of amine salts of nitrated phenolic compounds which have valuable insecticidal properties. Unlike the alkali metal salts, these new compounds, though combustible, do not burn violently.

The amine salts of the present invention may be represented by the general formula:

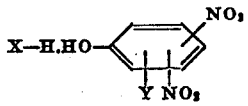

in which X represents a member of the group consisting of

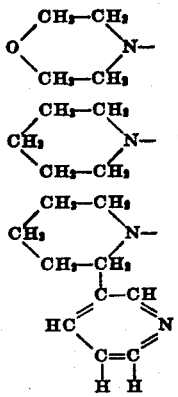

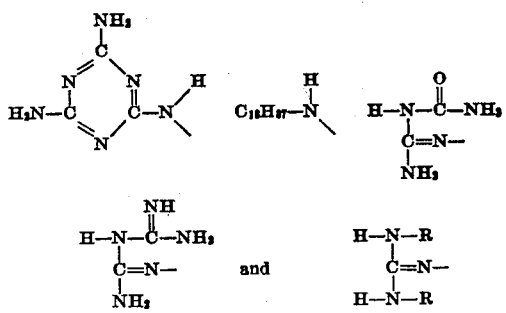

R being a member of the group consisting of hydrogen and an aryl radical, and Y represents a member of the group consisting of hydrogen, cyclohexyl, terpenyl and alkyl radicals.

These new compounds are prepared by double decomposition, e. g., by mixing together an aqueous solution of an alkali metal salt of a nitrated phenolic compound,

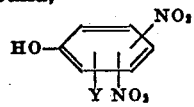

and an aqueous solution, emulsion or the like of an inorganic salt of an amine,

X—H the symbols X and Y being defined as above. The two salts react immediately and the amine salt of the nitrated phenolic compound is precipitated. The product is then removed from the aqueous solution containing the inorganic alkali metal salt, washed with water and dried. The formation of these new compounds may be illustrated by the following equation:

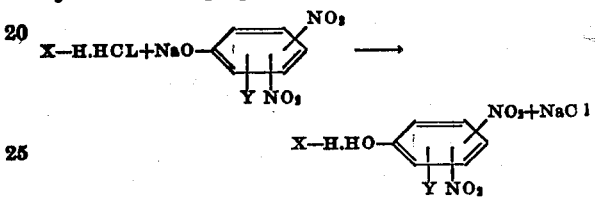

The invention will be illustrated in greater detail by the preparation of the compounds shown in the following examples. Parts indicated are by weight.

Example 1

A solution consisting of 2.44 parts of guanidine nitrate dissolved in 20 parts of water was added with stirring at a temperature of 25° C. to a solution consisting of 4.8 parts of the sodium salt of dinitro-para-tertiary-butyl-phenol dissolved in 125 parts of water. The precipitate which formed was filtered off, washed with water and dried. 5 parts of the guanidine salt of dinitro-para-teriary-butyl-phenol were obtained. The product was a finely divided crystalline material having the color of red lead and melting at 285° C.

Example 2

10.2 parts of the sodium salt of dinitro-para-tertiary-amyl-phenol were dissolved in 130 parts of water. The resulting solution was added with stirring to a solution consisting of 6.06 parts of guanyl urea sulphate dissolved in 140 parts of water. The precipitated salt was removed by filtration, washed with water and dried. 10.5 parts of the guanyl urea salt of dinitro-para-tertiary-amyl-phenol were obtained. The product was orange colored and finely divided, melting at 236° C. with slight decomposition.

Example 3

5.92 parts of biguanide sulphate were dissolved in 100 parts of water at 25° C. The resulting solution was gradually added with good agitation to a solution consisting of 10 parts of the sodium salt of dinitro-bornyl-phenol dissolved in 250 parts of water. After standing for one-half hour the reaction mixture was filtered and the precipitate washed with water and dried. 12.6 parts of the biguanide salt of dinitro-bornyl-phenol were obtained as a dark red crystalline solid, M. P. 168° C.

*Example 4*

A solution consisting of 3 parts of the sodium salt of dinitro-ortho-cyclohexyl-phenol dissolved in 125 parts of water was added with stirring at room temperature to a solution consisting of 1.37 parts of piperidine hydrochloride dissolved in 75 parts of water. The precipitate which formed was removed by filtration, washed with water and dried. 3.5 parts of the piperidine salt of dinitro-ortho-cyclohexyl-phenol were obtained as a salmon red, finely divided solid having a melting point of 150° C.

*Example 5*

2.48 parts of morpholine hydrochloride were dissolved in 200 parts of water. The resulting solution was slowly added with stirring to a solution consisting of 4.8 parts of the sodium salt of dinitro-para-tertiary-butyl-phenol dissolved in 125 parts of water. The precipitated salt was filtered off, washed with water and dried. 4.2 parts of the morpholine salt of dinitro-para-tertiary-butyl-phenol were obtained. The product was a golden yellow crystalline material, melting point of 137° C.

*Example 6*

A solution consisting of 3 parts of the sodium salt of dinitro-ortho-cyclohexyl-phenol dissolved in 125 parts of water was added with stirring to a solution consisting of 2.38 parts of anabasine sulphate dissolved in 75 parts of water. The anabasine salt of dinitro-ortho-cyclohexyl-phenol precipitated immediately, and was removed by filtration, washed with water and dried. The product was an orange-yellow, finely divided solid, melting at 205° C.

*Example 7*

10 parts of the sodium salt of dinitro-bornyl-phenol were dissolved in 250 parts of water. The resulting solution was added with stirring to a solution consisting of 4.85 parts of melamine hydrochloride in 200 parts of water warmed to 45°–50° C. The precipitate which formed was filtered off, washed with water and dried. 14 parts of the melamine salt of dinitro-bornyl-phenol were obtained as an orange-red, finely divided crystalline solid having a melting point of 236° C.

*Example 8*

10 parts of the sodium salt of dinitro-ortho-cresol were dissolved in 150 parts of water. The resulting solution was added with stirring to a solution consisting of 16 parts of octadecyl amine hydrochloride in 500 parts of water warmed to 50°–55° C. The octadecyl amine salt of dinitro-ortho-cresol precipitated immediately in the warm solution. The reaction mixture was filtered and the precipitate washed with water and dried. The product was a lemon-yellow granular material, melting at 65° C.

*Example 9*

A solution consisting of 12.2 parts of sym.-dixylyl guanidine hydrochloride dissolved in 140 parts of water was added with stirring at a temperature of 25° C. to a solution consisting of 10.2 parts of the sodium salt of dinitro-para-tertiary-amyl-phenol dissolved in 130 parts of water. The precipitate which formed was filtered off, washed with water and dried. 15.7 parts of the sym.-dixylyl guanidine salt of dinitro-para-tertiary-amyl-phenol were obtained. The product was an orange-yellow, bulky material melting at 110° C. with some decomposition.

*Example 10*

A solution consisting of 4.4 parts of the sodium salt of dinitro-ortho-cresol dissolved in 70 parts of water was added with stirring at room temperature to a solution consisting of 2.44 parts of guanidine nitrate dissolved in 20 parts of water. The precipitate which formed was removed by filtration, washed with water and dried. The guanidine salt of dinitro-ortho-cresol was obtained as a light orange-yellow finely divided solid, melting at 175° C., in a yield equal to that of the theoretical.

Other amine salts of the present invention which have been prepared substantially according to the procedure of the foregoing examples include the guanidine salt of dinitro-phenol, a golden yellow finely divided solid, melting point 190° C.; the biguanide salt of dinitro-o-cresol, a light red crystalline solid melting point 105° C.; the guanyl urea salt of dinitro-o-cresol, a yellow finely divided solid, melting point 175° C. (decomp.); the sym.-dixylyl guanidine salt of dinitro-o-cresol, a bright yellow voluminous product, melting point 91° C.; the guanidine salt of dinitro-o-cyclohexyl-phenol, a light red, finely divided crystalline solid melting point 292° C. (decomp.); the guanyl urea salt of dinitro-o-cyclohexyl-phenol, a light orange-yellow, finely divided solid, melting point 205° C. (decomp.); the biguanide salt of dinitro-o-cyclohexyl-phenol, a yellow finely divided solid, melting point 120° C.; the sym.-dixylyl guanidine salt of dinitro-o-cyclohexyl-phenol, a bright yellow crystalline solid, melting point 150° C. (decomp.); the guanyl urea salt of dinitro-phenol, a dark yellow finely divided solid, M. P. 188° C.; the guanyl urea salt of dinitro-p-tertiary-butyl-phenol, an orange-yellow, finely divided solid, melting point 220° C. (decomp.); the biguanide salt of dinitro-phenol, golden yellow flat needle-like crystals, melting point 208° C.; the biguanide salt of dinitro-p-tertiary-butyl-phenol, a light red, finely divided crystalline solid, melting point 236° C.; the sym.-dixylyl guanidine salt of dinitro-p-tertiary-butyl-phenol, an orange-yellow, voluminous product, melting point 110° C.; the guanidine salt of dinitro-p-tertiary-amyl-phenol, a dark red finely divided solid, melting point 260° C.; the biguanide salt of dinitro - p - tertiary - amyl - phenol, an orange-yellow crystalline solid, melting point 211° C.; the guanidine salt of dinitro-bornyl-phenol, a light red bulky product, melting point 182° C.; the guanyl urea salt of dinitro-bornyl-phenol, a dark red bulky product, melting point 186° C.; the sym.-dixylyl guanidine salt of dinitro-bornyl-phenol, an orange-yellow voluminous product, melting point 117° C.; the morpholine salt of dinitro-o-cresol, a light red voluminous product, melting point 155° C.; the piperidine salt of dinitro-phenol, yellowish brown needle-like crystals, M. P. 145° C.; the piperidine salt of dinitro-o-cresol, a brown crystalline solid, melting point 140° C.; the morpholine salt of dinitro-o-cyclohexyl-phenol, an orange colored finely divided solid, melting point 139° C.; the piperidine salt of dinitro-p-tertiary-butyl-phenol, a lemon-yellow, finely divided solid, melting point 112° C.; the morpholine salt of dinitro-p-tertiary-amyl-phenol, a golden yellow crystalline solid, melting point 136° C.; the piperidine salt of dinitro-p-tertiary-amyl-phenol, a brown crystalline solid, melting point 128° C.; the morpholine salt of dinitro-bornyl-phenol, a brown resinous product, soft at room temperature; the anabasine salt of dinitro-phenol, a thick dark brown oily liquid at 25° C.; the anabasine salt of dinitro-bornyl-phenol, a greenish yellow, finely divided solid, melting point 85° C.; the melamine salt of dinitro-phenol, a light yellow, finely divided solid, decomposes on heating; the melamine salt of dinitro-o-cresol, a bright yellow finely divided product, melting point 240° C. (decomp.); the melamine salt of dinitro-o-cyclohexyl-phenol, a yellow crystalline solid, melting point 100° C.; the melamine salt of dinitro-p-tertiary-butyl-phenol, a light red, finely divided crystalline solid, melting point 250° C. (decomp.); the melamine salt of dinitro-p-tertiary-amyl-phenol, a deep red finely divided solid, melting point 175° C. (decomp.); the octadecyl amine salt of dinitro-phenol, a lemon-yellow, finely divided solid, melting point 91° C.; the octadecyl amine salt of dinitro-p-tertiary-butyl-phenol, an orange colored granular product, melting point 60° C., and the octadecyl amine salt of dinitro-bornyl-phenol, a dark red bulky product, soft at room temperature.

The products of this invention, and in particular the guanidine salts, have been found suitable as stomach poisons in controlling insects when applied in the form of dusts with inert solid diluents such as talc, wood flour, walnut shell, and the like. They may also be used as intermediates and as pigments.

While the invention has been described with particular reference to specific embodiments, it is to be understood that it is not to be limited thereto, but is to be construed broadly and restricted solely by the scope of the appended claims.

I claim:
1. A method of preparing an amine salt of a nitrated phenolic compound having the formula:

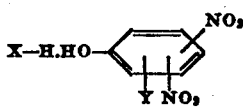

in which X represents a member of the group consisting of

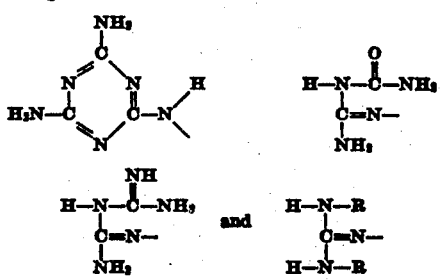

R being a member of the group consisting of hydrogen and an aryl radical, and Y represents a member of the group consisting of hydrogen, cyclohexyl, terpenyl and alkyl radicals, which comprises reacting together in an aqueous medium an inorganic salt of an amine, X—H, and an alkali metal salt of a nitrated phenolic compound,

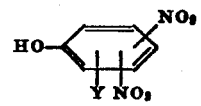

X and Y being defined as above, separating and recovering the amine salt of the nitrated phenolic compound.

2. The method of claim 1, in which the reactants are in substantially equimolecular ratio.

3. An amine salt of a nitrated phenolic compound having the formula:

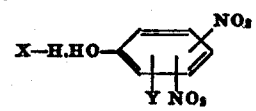

in which X represents a member of the group consisting of

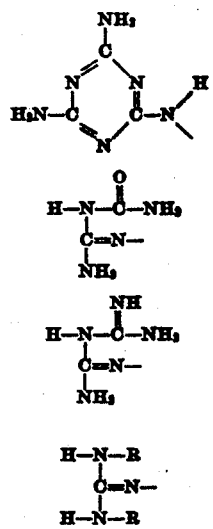

R being a member of the group consisting of hydrogen and an aryl radical, and Y represents a member of the group consisting of hydrogen, cyclohexyl, terpenyl and alkyl radicals.

4. A guanidine salt of a nitrated phenolic compound having the formula:

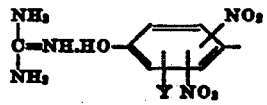

in which Y represents a member of the group consisting of hydrogen, cyclohexyl, terpenyl and alkyl radicals.

5. The guanidine salt of dinitro-ortho-cresol.
6. The guanidine salt of dinitro-ortho-cyclohexyl-phenol.
7. The guanidine salt of dinitro-bornyl-phenol.

VARTKES MIGRDICHIAN.